UNITED STATES PATENT OFFICE.

JOHN J. CALLOW, OF CLEVELAND, OHIO.

PROCESS OF MANUFACTURING PERFORATED METALLIC GOODS.

SPECIFICATION forming part of Letters Patent No. 313,805, dated March 10, 1885.

Application filed April 30, 1884. (Specimens.)

*To all whom it may concern:*

Be it known that I, JOHN J. CALLOW, a citizen of the United States, residing at Cleveland, in the county of Cuyahoga and State of Ohio, have invented certain new and useful Improvements in Methods of Manufacturing Perforated Metallic Goods, of which the following is a specification.

Heretofore perforations in sheet metal—such as stencil-plates—had to be produced by cutting out certain parts of the sheet metal by means of dies, punches, presses, &c., which is a laborious and expensive process.

The object of my invention is to obviate this difficulty, and to produce a plate of perforated metal for graining, frescoing, or other ornamental or printing purpose, and for the general manufacture of fancy and useful metallic goods used in the arts and manufactures by means of electro-metallurgy.

In carrying out my invention I take a sheet of material which is a non-conductor of electricity—such as glass, porcelain, or porcelain-coated metal—preferring sheet-glass for my purpose. This I form with an intaglio of the pattern desired to be produced, which intaglio I form by etching with hydrofluoric acid, sand-blasting, or both, or by any other suitable means, the intaglio being formed to a depth representing about the thickness of the metal plate to be manufactured. If the glass be etched to form the intaglio, I go over the said etching a second time with the sand-blast or other grinding process, so as to granulate or roughen the acid-etched surface, which granulation or roughening is to adapt it to hold the bronze-powder, plumbago, or other superficial conductive coating which I afterward apply thereto. After the intaglio pattern is formed I wash over the pattern with benzine or any thin oily substance, and then clean off the plain or polished surface of the glass, wiping it dry while the etched or intaglio surface remains moist. I now dust over the entire glass surface with plumbago or bronze-powder, which adheres to the intaglio surface by reason of the attraction which the benzine and the granulated surface affords, while the surface proper of the glass being dry and polished does not retain any of the conductive powder, but allows the latter to be readily dislodged. I now submerge the glass plate thus prepared into a metallic plating-solution, using a plating-battery, preferably a "Smee;" but any good plating-machine will answer. Connection being then made with the conductive coating in the intaglio pattern, a deposit of copper or other metal is thus formed on the pattern in the intaglio surface, while the bright and clean spaces of the glass plate between the pattern being a non-conductive of electricity receives no deposit, and represents the open spaces of the metallic pattern. After the metal pattern is thus formed it is removed from the glass plate, and is smoothed, trimmed, and finished. By this method thousands of metal patterns can be rapidly and cheaply produced from one and the same non-conducting intaglio plate, and no further expense or delay is incurred in making the pattern on the glass a second time, as would be the case were it done on wax surface alone, which would require the pattern to be renewed for every plate produced.

For many purposes I would form the intaglio pattern by sand-blasting or wheel-grinding alone; but I prefer the acid etching first to get depth, and the sand-blast or grinding secondarily to granulate the acid-etched surface to make it hold the conductive powder.

By means of my invention not only perforated metal stencils and patterns can be readily formed and multiplied at will, but also printing-surfaces, dies, and all sorts of ornamental open-work may be produced.

I am aware that it is not new to coat a glass plate with varnish, and then cut any design through the varnish, and then make the surface of the remaining varnish a conductor of electricity, and then form an electro-deposit of metal thereon, and I do not claim this method.

I am also aware of English Patent No. 825 of 1874, in which is described a method of inlaying marble with copper by etching the marble surface with acid, then rendering the etched surfaces conductive, and finally depositing a permanently-adhering electroplate of metal in said etched surfaces.

What I claim is—

1. The method herein described of manufacturing perforated or other open-work metal goods—such as stencils, patterns, &c.—which consists in forming a non-conducting plate with an intaglio surface representing the pattern to be produced, then rendering the intaglio surface a conductor of electricity, substantially as described, then immersing the plate in an electroplating-solution, and depositing metal upon the conductive intaglio surface, and finally removing the pattern of deposited metal, as and for the purpose described.

2. The method herein described of manufacturing metal goods—such as stencil-patterns, &c.—which consists in forming a nonconducting surface or plate in whole or part with an intaglio surface representing the pattern or form to be produced, then rendering the said intaglio surface a conductor of electricity, substantially as described, and finally immersing the plate or form in an electroplating-solution and depositing metal upon the said conductive or engraved surface, as described.

JOHN J. CALLOW.

Witnesses:
JNO. T. SULLIVAN,
J. G. SANDERS.